United States Patent [19]
Zabrocki et al.

[11] Patent Number: 5,306,548
[45] Date of Patent: Apr. 26, 1994

[54] COEXTRUDED WEATHERABLE FILM STRUCTURES AND LAMINATES

[75] Inventors: Vincent S. Zabrocki, Newark; Robert H. Kelch, Granville, both of Ohio

[73] Assignee: The Dow Chemical Company, Midland, Mich.

[21] Appl. No.: 886,655

[22] Filed: May 20, 1992

[51] Int. Cl.$^5$ .................. B32B 7/02; B32B 27/08
[52] U.S. Cl. .................. 428/215; 428/220; 428/408; 428/423.1; 428/424.6; 428/424.7; 428/424.8; 428/483; 428/517; 428/519; 428/521; 428/2; 264/176.1
[58] Field of Search ............... 428/515, 215, 220, 408, 428/423.1, 424.6, 424.7, 424.8, 483, 517, 519, 521; 264/176.1

[56] References Cited

U.S. PATENT DOCUMENTS

| | | | |
|---|---|---|---|
| 3,173,893 | 3/1965 | Fertig et al. | 526/313 |
| 3,368,916 | 2/1968 | Hattori | 428/515 X |
| 3,473,996 | 10/1969 | Whalen | 428/339 |
| 3,804,705 | 4/1974 | Kishikawa et al. | 428/511 X |
| 3,860,551 | 1/1975 | Narayana et al. | 524/505 |
| 3,970,718 | 7/1976 | Takahashi et al. | 525/76 |
| 4,202,948 | 5/1980 | Peascoe | 525/70 |
| 4,302,554 | 11/1981 | Nabeta et al. | 428/462 X |
| 4,338,378 | 7/1982 | Nabeta et al. | 428/462 |
| 4,341,884 | 7/1982 | Schepers | 525/211 |
| 4,341,885 | 7/1982 | Schepers | 525/211 |
| 4,373,063 | 2/1983 | Sakano et al. | 525/64 |
| 4,397,987 | 8/1983 | Cornell | 525/75 |
| 4,404,248 | 9/1983 | Spinelli et al. | 428/215 |
| 4,424,309 | 1/1984 | Schepers | 525/211 |
| 4,438,171 | 3/1984 | Wefer | 428/215 |
| 4,440,825 | 4/1984 | Paddock | 525/70 X |
| 4,444,840 | 4/1984 | Wefer | 428/521 X |
| 4,444,841 | 4/1984 | Wheeler | 428/462 X |
| 4,468,487 | 8/1984 | Schepers | 525/211 X |
| 4,522,971 | 6/1985 | DeBergalis | 524/547 |
| 4,525,521 | 6/1985 | Den Hartog et al. | 428/425.5 |
| 4,528,221 | 7/1985 | Komatsuzaki et al. | 428/910 X |
| 4,563,505 | 1/1986 | Atomori et al. | 525/316 |
| 4,576,860 | 3/1986 | Fink et al. | 428/314.4 |
| 4,582,871 | 4/1986 | Noro et al. | 524/413 |
| 4,591,533 | 5/1986 | Antonelli | 428/515 X |
| 4,592,861 | 6/1986 | Bekele et al. | 524/495 X |
| 4,666,961 | 5/1987 | Nauman | 524/481 X |
| 4,680,234 | 7/1987 | Kelch | 428/461 |
| 4,724,186 | 2/1988 | Kelch | 428/461 X |
| 4,731,401 | 3/1988 | Moteki et al. | 524/271 |
| 4,885,342 | 12/1989 | Bakker | 525/230 |
| 4,910,067 | 3/1990 | O'Neill | 264/45.3 X |
| 4,936,936 | 6/1990 | Rohrbacher | 156/239 |
| 4,992,322 | 2/1991 | Currey et al. | 428/215 |

FOREIGN PATENT DOCUMENTS

| | | |
|---|---|---|
| 8660580 | 7/1985 | Australia . |
| 887931 | 3/1980 | Belgium . |
| 104899 | 9/1982 | European Pat. Off. . |
| 0037609 | 6/1984 | European Pat. Off. . |
| 224688 | 10/1985 | European Pat. Off. . |
| 278563 | 2/1987 | European Pat. Off. . |
| 2843987 | 6/1978 | Fed. Rep. of Germany . |
| 6072024 | 11/1979 | Japan . |
| 8196239 | 5/1982 | Japan . |
| 8217181 | 6/1982 | Japan . |
| 8222133 | 6/1982 | Japan . |
| 9073947 | 10/1982 | Japan . |
| 9178250 | 3/1983 | Japan . |
| 2069236 | 9/1988 | Japan . |
| 7010007 | 7/1969 | Netherlands . |
| 1464692 | 2/1977 | United Kingdom . |

Primary Examiner—P. C. Sluby

[57] ABSTRACT

A coextruded weatherable film for lamination to an underlying nonweatherable substrate, including, for example, a two-layer film structure including an outer layer of a weatherable polymer that provides weather resistance such as ethylene/propylene/nonconjugated diene-reinforced styrene/acrylonitrile copolymer (AES) or butyl acrylate-reinforced styrene/acrylonitrile copolymer (ASA), coextruded over a thermoplastic underlying layer, for example, of a carbon black pigmented, UV stabilized polymer such as chlorinated polyethylene that provides UV protection for an underlying substrate such as vinyl siding or polymer layers.

12 Claims, 1 Drawing Sheet

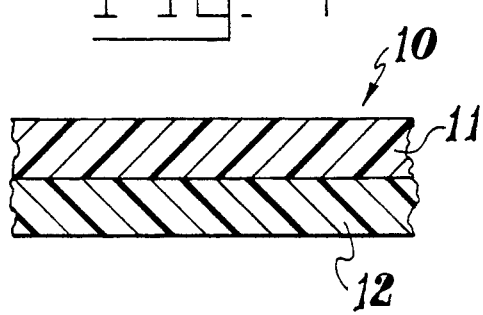
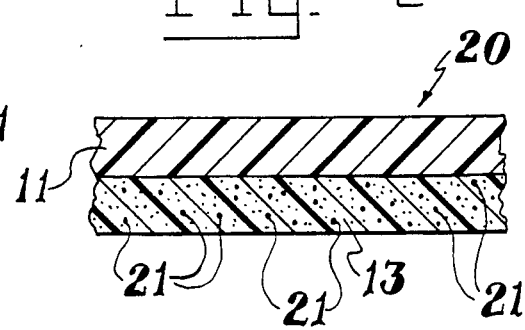
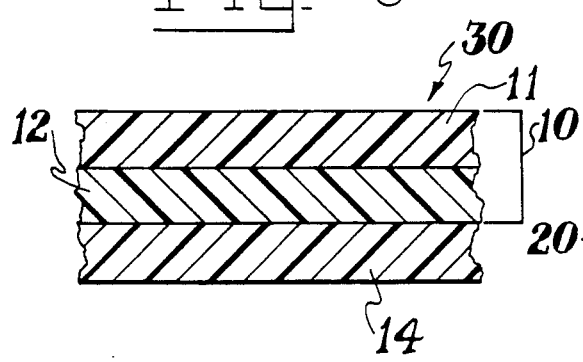
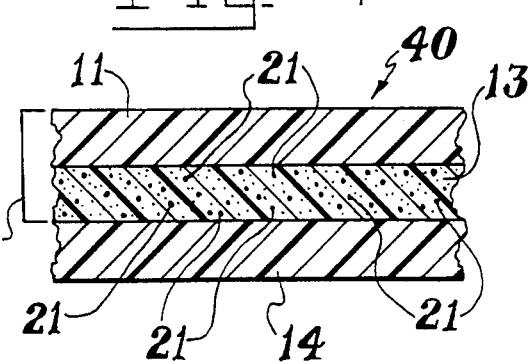

COEXTRUDED WEATHERABLE FILM STRUCTURES AND LAMINATES

BACKGROUND OF THE INVENTION

The present invention relates to coextruded weatherable films for providing weatherable surface coating for numerous substrates. More particularly, the present invention relates to at least a two-layer coextruded flexible film structure including at least one outer weatherable layer and at least one underlying thermoplastic layer.

Various films and film structures that exhibit weather resistant properties are known in the art. For example, various structures employing AES (acrylonitrile-ethylene/propylene rubber-styrene) graft copolymers or ASA (acrylonitrile-styrene-acrylate rubber) graft copolymers are described in U.S. Pat. Nos. 4,438,171; 4,440,825; 4,444,840; and 4,444,841.

U.S. Pat. No. 4,438,171 discloses a coextruded sheet product having a total thickness of from 25 to 500 mils by coextruding an AES weatherable film surface layer on an underlaying thermoplastic sheet. U.S. Pat. No. 4,438,171, however, does not disclose coextruded film structures, but instead discloses coextruded sheet structures.

U.S. Pat. No. 4,438,171 describes a coextruded sheet structure of 25 to 500 mils, the surface layer of the sheet structure being 3 to 150 mils of AES graft polymer. The total thickness of the sheet precludes the sheet from being used in applications where thin films (generally less than 25 mils and preferably less than 10 mils) are used. Thin film generally is made on different types of equipment than thick sheet. There is a difficulty in extruding a thin film on a thick layer due to viscosity differences. A uniform film gauge across a thick sheet structure is not readily achieved. Since different polymer viscosities exist, different flow properties exist. Therefore, at a thicker gauge, it becomes more difficult to coextrude, for example, a 3 mil onto a 25 mil substrate.

U.S. Pat. No. 4,440,825 discloses a thick, foamed two-layer structure more specifically an AES polymer (non-specified EPDM) laminated onto a rigid foamed thermoplastic, such as a foamed ABS or foamed PVC, which is compatible with the AES. The Example in U.S. Pat. No. 4,440,825 describes an unexpanded ABS core 0.10 inches (100 mils) thick (which can be expanded to 400 mils when foamed), with 0.05 inch (50 mils) adjacent solid ABS layers, and AES weatherable skins of 0.025 inches (25 mils) thickness. Accordingly, U.S. Pat. No. 4,440,825 is directed toward very thick sheet production, and not thin films. Also, the structure described in U.S. Pat. No. 4,440,825 is assembled by lamination and not coextrusion.

U.S. Pat. No. 4,444,840 discloses a laminate with a surface monolayer (not a multilayer) produced from calendared 4 to 50 mil AES with the rubber content being 25 to 40 percent. Using the process of U.S. Pat. No. 4,440,840, one can not bind, for example, AES to polyethylene or polypropylene or other nonadhesiveable, non-compatible layers. It is desired to provide a film that can be integrally attached to layers of different polymers, to an adhesive, and not to bind different non-compatible. substrates using an adhesive backed film.

U.S. Pat. No. 4,444,841 discloses an extruded monolayer AES weatherable film having a thickness of from 1 mil to 10 mils and the use of said film as a surface layer on laminates. The laminate disclosed can be a variety of materials including thermoplastics and non-plastic materials. U.S. Pat. No. 4,444,841 describes an AES film of 1 to 10 mils made by a blown film process for lamination to metal or cellulosics. Such a blown film is typically less costly and has a higher quality than a calendered film. It is desired to provide a cast extrusion or calendered film rather than a blown film.

U.S. Pat. No. 4,444,841 does not teach coextrusion or making a multilayered adhesive containing structure. U.S. Pat. No. 4,444,841 teaches that where the AES is "not inherently mutually adhesive" to wood or metal, a suitable material may be applied to the AES film or substrate prior to lamination, which may involve pressure and temperature to assist in adhesion. The Example in U.S. Pat. No. 4,444,841 describes a liquid based heat sensitive polyurethane adhesive being applied to metal to bond the AES film to the metal, but does not teach a coextruded adhesive layer on the AES. There is still a need in the industry for a multilayer film with improved properties over a monolayer film such as taught in U.S. Pat. No. 4,444,841.

Typically, monolayer AES-type films require an aqueous or solvent-based liquid adhesive that adheres both to a substrate and the film for application of the film to the substrate. For example, a liquid adhesive is required to bond a wood substrate to a film. Also needed is the requisite equipment to apply and dry the liquid adhesive prior to applying the film to the substrate. Such a process is costly and complex due to stringent industrial hygiene requirement and environmental concerns and solvent recovery or disposal requirements. It is desired to provide a film and process which eliminates the need for liquid adhesives to adhere weatherable films such as monolayer AES-type films to a desired substrate.

Other coextruded film structures are also known. For example, U.S. Pat. Nos. 4,680,234 and 4,724,186 disclose weatherable coextruded flexible films and laminated structures thereof. The weatherable film layer comprises a blend of a vinyl chloride polymer, an interpolymer comprising ethylene and at least one carboxylic acid or ester thereof containing ethylenic unsaturation, and a chlorinated polyolefin. The other co-extrudates of the multilayer coextruded film of U.S. Pat. Nos. 4,680,234 and 4,724,186 can be an adhesive layer and optionally an interlayer comprising a copolymer of ethylene and vinyl acetate.

While a coextruded film structure having an adhesive layer, an interlayer and a weatherable resistant layer of a blend is disclosed in the above patents, AES and ASA-type films are not readily adherable to polyolefin polymers, metal, cellulosic materials or some other polymeric substrates. The chlorinated polyethylene (CPE) and polyvinylchloride (PVC) blends disclosed in U.S. Pat. Nos. 4,680,234 and 4,729,186 have generally low 1% secant modulus value of less than 150,000 psi. It is desired to produce a higher modulus, higher hardness and more scratch resistant polymeric surface than that which is achieved using the teachings of U.S. Pat. Nos. 4,680,234 and 4,729,186. Thus, there still exists a need in the industry for a multi-layered weatherable coextruded film which has good adhesion and is readily adherable to multiple substrates such as wood, metal, plastic and other structural substrates.

There is also a need in the industry to provide an economical coextruded film which is reprocessable i.e., a film which allows scrap material or rejects to be recycled readily.

In addition, there is still a need in the industry for a film having exceptional stability to ultraviolet light degradation and improved weathering characteristics.

SUMMARY OF THE INVENTION

The present invention is directed to a coextruded flexible film including at least one outer weatherable layer and at least one underlying tie layer intimately adhered to the outer weatherable layer.

In a preferred embodiment, the present invention is directed to a two-layer coextruded film structure adapted for use as a weatherable surface coating on a substrate comprises at least one surface layer of a weatherable polymer and an underlying tie layer adjacent the weatherable polymer layer. The underlying tie layer is intimately adherable to and compatible with the weatherable polymer layer and adapted to be intimately adherable to and compatible with a substrate.

BRIEF DESCRIPTION OF THE DRAWINGS

FIGS. 1 and 2 show enlarged, partial cross-sectional views of different embodiments of a two-layer film structure of the present invention.

FIGS. 3 and 4 show enlarged, partial cross-sectional views of various film structures of the present invention adhered to a substrate.

DETAILED DESCRIPTION OF THE PREFERRED EMBODIMENTS

With reference to FIG. 1, the present invention in its broadest scope includes a coextruded two-layer film 10 adapted for use as a weatherable surface coating on a substrate, said film 10 comprising an outer weatherable layer 11 produced from weatherable polymers or blends of weatherable polymers, and a second layer 12 being an underlying layer adhered to the weatherable layer 11.

The weatherable polymer layer 11 may be monolayer as shown in FIG. 1 or multilayer (not shown). The outer weatherable layer 11 may be made from various weather resistant polymer materials including, for example, (a) ethylene/propylene/nonconjugated diene-reinforced styrene/acrylonitrile copolymers (AES) or butyl acrylate-reinforced styrene/acrylonitrile copolymer (ASA), styrene acrylonitrile (SAN) or mixtures thereof and (b) any of the polymers of (a) blended with poly vinyl chloride (PVC), chlorinated polyethylene (CPE), aliphatic polyurethane, saturated styrenic block copolymers or mixtures of PVC and CPE.

The outer weatherable layer 11 is preferably extruded from weatherable polymers, for example, AES or ASA. When a rubber modified SAN, such as AES or ASA, is used for the outer weatherable layer 11, preferably the EPDM and/or acrylate rubber modifier content is from about 5 weight percent to about 40 weight percent, and more preferably from about 15 weight percent to about 25 weight percent. Commercially sold AES resins include, for example, ROVEL TM (a trademark of The Dow Chemical Company) and commercially sold ASA-type resins include for example Geloy TM resins (commercially available from General Electric Corporation) or Centrex TM resins (commercially available from Monsanto). Other materials useful for the weatherable layer include stabilized polyvinyl chloride (PVC), such as commercially available Duracap TM and Geon TM (commercially available from BF Goodrich) resins; acrylic, such as polymethylmethacrylate (PMMA) including commercially available Plexiglas TM (commercially available from Rohm & Haas) resins; fluoropolymers, such as (polyvinylidene fluoride) PVDF, such as Kynar TM (commercially available from Atochem) resins; and the like.

When a blend of polymers is used for the weatherable layer 11, generally, the styrenic polymers of (a) are from about 10 to about 90 weight percent and preferably from about 50 to about 90.

As an illustration, a blend of polymers employed as the weatherable outer layer 11 can be, for example, an AES or ASA-type resin blended with a thermoplastic elastomer. The thermoplastic elastomer can be, for example, an elastomer which is compatible with the AES and ASA resin and is weatherable. The elastomer can be selected, for example, from the group comprising chlorinated polyethylene, aliphatic urethane, saturated styrenic block copolymers and ethylene propylene diene copolymers. The use of the blend composition advantageously improves the stress whitening resistance of the AES and ASA-type weatherable films. In some instances the addition of certain elastomers can reduce film modulus and decrease scratch resistance and hardness. However, the blend can be used in applications wherein stress whitening is likely to occur, for example, in applications wherein the film is required to bend at some radius of a part being covered, since stress whitening usually occurs at the bend creating an undesirable color change; or in applications wherein the underlying substrate is subject to dimensional instability such as occurs with thermally induced expansion and contraction of the substrate, i.e., changes in coefficient of linear thermal expansion of a polymeric material. The elastomer employed in the weatherable thermoplastic composition blend is preferably present in an amount of from about 10 percent by weight to about 50 percent by weight, more preferably from about 10 weight percent to about 35 weight percent.

The second layer 12 of the two-layer film structure 10 of the present invention, is at least one underlying layer which may also be monolayer as shown in FIG. 1 or multilayer (not shown). The second layer 12 is intimately adherable to and compatible with the outer weatherable layer 11 and the second layer 12 is adapted to be intimately adherable to a substrate, i.e., the second layer 12 functions as a layer which ties or bonds together the outer weatherable layer 11 to a layer substrate 14 as shown in FIG. 3.

The second layer 12 employed in the present invention is preferably a 1 percent secant modulus of less than about 200,000 psi, more preferably, less than about 150,000 psi. The low modulus of the second layer results in an easily handleable and formable thin film structure. The coextruded thermoplastic second layer employed in the present invention may include, for example, CPE, styrenic diblock and triblock polymer, copolyamide adhesives, polyester adhesives, polyurethane adhesive, PVC and mixtures thereof. Additionally, reactive thermoplastic adhesives, such as moisture active polyurethanes which after extrusion will cross link to form thermoset-type characteristics upon exposure to moisture may also be utilized for the second layer.

As an illustration, the underlying second layer 12 preferably can be a thermoplastic polymer such as a styrenic block copolymer, for example, Stereon TM (commercially available from Firestone Rubber and Latex Company). It has been found that in instances of adhering the film 10 to a plastic substrate 14, for example, polystyrene in the form of shutters, the two-layer film utilizing the styrene block copolymer layer 12 as the adhesive layer is sufficient to attach the film 10 structure to the plastic substrate 14, for example, as illustrated in FIG. 3.

The weatherable polymer layer 11 and second layer 12 may contain additional additives or ingredients that will not adversely effect the properties of the layers. The additives may include, for example, colorants, ultraviolet (UV) and thermal stabilizers, fillers, antiblock agents, antioxidants, processing aids, lubricants, impact modifiers, pigments, and the like, in an amount ranging from about 0.01 weight percent to about 25 weight percent, preferably from about 0.05 weight percent to about 20 weight percent.

For example, the outer weatherable layer 11 may be pigmented so as to provide aesthetic appeal and may contain other additives which will not degrade the beneficial weathering characteristics of the layer 11. For example, layer 11 can contain gloss-reducing agents such as inorganic particles (talc, silicon dioxide), and the like or discrete organic particles generally of a polymeric nature for example, butylacrylate rubber in a 2 to 5 micron particle size.

For example, the tie layer 12 may include UV stabilizers for added protection against sun light depending on the thickness of the weatherable layer 11 and its opacity towards UV light. Additionally, pigments can be added to the tie layer 12 for increased opacity.

The second layer 12, in addition, may contain limited amounts of recycled/reused film product. The recycle content of the tie layer 12 will typically be from about 0 weight percent to about 70 weight percent, preferably from about 20 weight percent to about 50 weight percent.

With reference to FIG. 1 again, there is shown one embodiment of the present invention including a two-layer film 10 comprising a weatherable layer 11 and tie layer 12, in this instance, a polymeric layer 12 which can be directly adherable to a substrate. The embodiment shown in FIG. 1 is particularly useful for adhering the film 10 onto, for example, a plastic substrate directly without the need for additional application steps such as applying liquid adhesive solutions on the film and then drying the adhesive. The two-layer film 10 is also advantageously used when the weatherable layer 11 is not directly adherable to the substrate desired.

Referring to FIG. 2, there is shown another particularly advantageous embodiment of a film 20 of the present invention, comprising a weatherable layer 11 and an underlying second layer 13 having incorporated therein pigment material 21. The pigment material, in this instance, may be carbon black. The second layer 13 in this embodiment is comprised of the same materials as layer 12 of FIG. 1 except that FIG. 2 shows the carbon black 21 incorporated therein. The use of carbon black in layer 13 is to further stabilize the film structure for long-term weatherability. This stabilization can best be achieved by incorporation of carbon black and additional conventional UV stabilizers, such as hindered amine light stabilizers (HALS).

Typical organic UV stabilizers such as HALS, benzophenone or benzotriazole UV absorbers, or hindered phenolic antioxidants, are eventually consumed by the stabilization mechanisms or are lost from the film by stabilizer migration and volatilization out of the film matrix. This loss of stabilizer results in degradation of the film and loss of weatherable characteristics. In the case of a non-weatherable resin that needs to be UV stabilized, addition of stabilizer will provide weatherability until the stabilizer is eventually consumed or lost due to migration. However, by adding carbon black particles 21 to the resin in layer 13, substantial improvement in polymer stabilization and weatherability can be achieved. Carbon black is well known to be an excellent UV stabilizer. Additionally, the black absorbs all of the UV radiation that causes polymer degradation. Thus, carbon black will protect all underlying polymer layers, adhesive or substrate from degradation by UV radiation. The carbon black utilized can be of any type, although small particle size grades of black provide the best UV screening and stabilization.

The black color imparted by the carbon black, however, is objectionable and not aesthetically appealing for most consumer applications. In the particular embodiment of the present invention shown in FIG. 2, an exceptionally appealing color pigmented weatherable resin layer 11 is coextruded over the black pigmented and UV stabilized resin layer 13. A substrate 14 which is covered by the film 20 as shown in FIG. 4 will then be shielded from destructive UV radiation by the black pigmented layer 13. The top weatherable pigmented layer 11 of the film 20 should be of sufficient gauge and pigment loading to cover and hide the underlying black layer 13.

In the embodiment of the present invention shown in FIG. 2, the black pigment 21 is incorporated in the second layer 13 which can be comprised of a lower cost, non-weatherable polymer, but which must be adherable to and compatible with the weatherable polymer 11. The carbon black provides excellent UV stability and some weatherability to the non-weatherable second layer. The black layer 13 also provides UV screening and protection to any underlying coextruded layers, adhesive layers, or substrates. Additionally, the black coextruded layer 13 provides for good structure recyclability by allowing edge trim, scrap stock, offgrade product, etc., to be recycled back into the film without adversely affecting the overall weatherability of the structure.

As an illustration of one particular embodiment of the present invention, a desired weatherable film for lamination to a substrate such as vinyl siding might consist of a pigmented weatherable AES or ASA polymer (such as ROVEL TM or Geloy TM) coextruded over a black pigmented CPE polymer layer (such as TYRIN TM). The outer ROVEL TM layer will provide excellent weatherability and the black CPE layer will provide adhesion to a substrate. The film allows for recyclability (into the CPE layer) and provides improved film properties and lower cost.

The film structure of the present invention may be prepared utilizing well known coextrusion processes. The coextrusion process used to prepare the film of the present invention is described in more detail in Modern Plastics Encyclopedia, McGraw-Hill, 1990, pages 252 to 270.

The total thickness of the film of the present invention, including for example film 10 or film 20, is less than about 25 mils, preferably from about 1 mil to about 15 mils, more preferably from about 3 to about 10 mils. Suitably, each layer of a film structure prepared according to the present invention can be less than 20 mils and preferably less than 10 mils. In one preferred embodiment, the weatherable layer is from about 2 mils to about 10 mils and the second layer is suitably from about 1 mil to about 5 mils.

The film structure of the present invention can be applied to a desired substrate by any well known techniques in the art and preferably by means of heat and pressure. Conventional processes include, for example, hot roll lamination, in-mold injection molding, vacuum/thermoforming and compression molding. Modern Plastics Encyclopedia, McGraw-Hill, 1990, pages 258-354.

Several weatherable polymer films of the present invention have been identified as a desirable film coating or cap stock over lower cost or nonweathering construction materials such as polystyrene, poly (vinyl chloride), polyethylene or other engineering thermoplastics. For instance, applications can include but not be restricted to exterior vinyl siding and plastic shutters, doors and windows. The weatherable exterior coating is employed with these substrates to minimize maintenance such as painting, and to provide aesthetics and long term weatherability.

EXAMPLE 1

In this Example, a two-layer coextruded film was prepared in accordance with the present invention.

The two-layer coextruded film was produced by a conventional cast film coextrusion method. The first layer of the two-layer film was a weatherable AES-ASA polymer blend layer (ROVEL TM XU74095.00 available from The Dow Chemical Company) having a 1% secant modulus of 213,000 psi with 10 parts per hundred resin (phr) of a shale color concentrate. The second layer of the two-layer film was a coextruded layer comprised of a styrene-butadiene diblock polymer having a 1% secant modulus of 9,900 psi (STEREON TM 840 available from Firestone Synthetic Rubber and Latex Company) having 2 phr of a UV stabilizer concentrate and 3 phr of a carbon black concentrate.

The two-layer film was coextruded at a 410° F. to 430° F. temperature at a total gauge of 6 mils, wherein the top weatherable layer was 4 mils and the second underlying layer was of 2 mils.

The coextruded film of Example 1 was laminated on to high impact polystyrene (HIPS) sheet to provide a weatherable surface for the substrate.

The film could not be peeled off of the substrate. The strength of the adhesion exceeded the tensile of the film.

The weatherable layer polymer was advantageously compatible with the second layer such that composite film edge trim or scrap roll material could be recycled back into the second layer.

EXAMPLE 2

In this Example, a two-layer coextruded film was prepared in accordance with the present invention and then laminated to a substrate.

The two-layer film was made using a conventional cast coextruded film equipment and method. The first layer of the two-layer film was a weatherable layer comprised of an AES polymer having a 1% secant modulus of 325,000 psi (ROVEL TM 501 available from The Dow Chemical Company) having 10 phr of a shale color concentrate. The second layer of the two-layer film was comprised of a CPE polymer having a 1% secant modulus of 2,000 psi (TYRIN TM 3611 available from The Dow Chemical Company), plus conventional process stabilizers and having 4 phr of a carbon black concentrate.

The two-layer film was coextruded at a 410° F. to 430° F. temperature at a total gauge of 6 mils, wherein the top weatherable layer was 4 mils and the second underlying layer was of 2 mils.

The resulting two-layer film was thermally laminated onto an extruded 35 mil rigid PVC sheet (extruded at 400° F.), which was then roll formed (while hot) into vinyl siding.

The first layer provided a low gloss, durable, weatherable, aesthetically pleasing surface finish on the vinyl siding. The second layer provided a recycle layer, adhesion to the PVC substrate, and UV screening to protect the CPE and CPE/PVC interface from degradation.

We claim:

1. A coextruded multilayer weatherable film product adapted to be adhered as a weatherable surface coating onto a substrate in a separate process operation, comprising:
   at least a first thermoplastic surface layer of a weatherable polymer comprising (a) AES, ASA, SAN or mixtures thereof or (b) any of the polymers of (a) blended with PVC, CPE, aliphatic polyurethanes or saturated styrenic block copolymers; said first layer having a 1% secant modulus of greater than about 100,000 psi and said first layer having a thickness of about 20 mils or less; and
   at least a second thermoplastic layer underlying the weatherable layer, said second layer being adjacent to and adhered to said first layer and said second layer adapted to be adhered to the substrate in a subsequent operation; said second layer having a 1% secant modulus of less than about 200,000 psi and said second layer having a thickness of about 20 mils or less; wherein the total thickness of the coextruded weatherable film is less than 25 mils.

2. The film of claim 1 wherein the second layer comprises CPE, styrenic block polymer, copolyamide adhesives, copolyester adhesives, PVC, polyurethanes and mixtures thereof.

3. The film structure of claim 2 wherein the second layer is a styrenic block copolymer.

4. The film of claim 2 wherein the second layer is a chlorinated polyethylene.

5. The film of claim 1 wherein the weatherable layer contains an ultraviolet light stabilizer.

6. The film of claim 5 wherein the ultraviolet stabilizer is from about 0.05 to about 3 weight percent.

7. The film of claim 1 wherein the first and/or second layer contains pigment.

8. The film of claim 7 wherein the pigment of the second layer is carbon black.

9. The film of claim 8 wherein the carbon black is from about 0.5 to about 5 weight percent.

10. A laminated structure comprising a substrate having adhered thereto a coextruded film structure of claim 1.

11. The laminated structure of claim 10 wherein the substrate is polymeric.

12. A process for producing a coextruded multilayer film product adapted to be adhered as a weatherable surface coating onto a substrate in a separate process operation, comprising:
   coextruding at least a first thermoplastic surface layer of a weatherable polymer with at least a first underlying layer adjacent to the weatherable polymer layer, said first surface layer comprising (a) AES, ASA, SAN or mixtures thereof of (b) any of the polymers of (a) blended with PVC, CPE, aliphatic polyurethanes or saturated styrenic block copolymers, said first surface layer having a 1% secant modulus of greater than about 100,000 psi, said first surface layer having a thickness of about 20 mils or less, said first underlying layer intimately adherable to and compatible with the weatherable polymer layer, said first underlying layer having a 1% secant modulus of less than about 200,000 psi, said first underlying layer having a thickness of about 20 mils or less; and said first underlying layer adapted to be intimately adherable to and compatible with a substrate.

* * * * *